United States Patent
Warshavsky et al.

(10) Patent No.: US 11,385,945 B2
(45) Date of Patent: Jul. 12, 2022

(54) METHOD AND SYSTEM FOR EVENT CONSUMER MANAGEMENT IN AN AGGREGATED EVENT PLATFORM

(71) Applicant: salesforce.com, inc., San Francisco, CA (US)

(72) Inventors: Alex S. Warshavsky, Walnut Creek, CA (US); Lawrence Eugenio McAlpin, Bloomington, IN (US); Alexey Syomichev, Westport, CT (US)

(73) Assignee: salesforce.com, inc., San Francisco, CA (US)

( * ) Notice: Subject to any disclaimer, the term of this patent is extended or adjusted under 35 U.S.C. 154(b) by 144 days.

(21) Appl. No.: 16/208,388

(22) Filed: Dec. 3, 2018

(65) Prior Publication Data
US 2020/0174854 A1    Jun. 4, 2020

(51) Int. Cl.
| | |
|---|---|
| G06F 9/54 | (2006.01) |
| G06F 16/2455 | (2019.01) |
| G06F 9/455 | (2018.01) |
| G06F 16/958 | (2019.01) |

(52) U.S. Cl.
CPC .......... *G06F 9/542* (2013.01); *G06F 9/45558* (2013.01); *G06F 16/24556* (2019.01); *G06F 16/958* (2019.01); *G06F 2009/45562* (2013.01)

(58) Field of Classification Search
CPC .. G06F 9/542; G06F 16/958; G06F 16/24556; G06F 9/45558; G06F 2009/45562
See application file for complete search history.

(56) References Cited

U.S. PATENT DOCUMENTS

| | | |
|---|---|---|
| 7,730,478 B2 | 6/2010 | Weissman |
| 8,583,587 B2 | 11/2013 | Warshavsky et al. |
| 8,661,056 B1 | 2/2014 | Cinarkaya et al. |

(Continued)

FOREIGN PATENT DOCUMENTS

| | | |
|---|---|---|
| EP | 3229151 A1 | 10/2017 |
| WO | 2018064375 A1 | 4/2018 |

OTHER PUBLICATIONS

Sookocheff, Kevin, "Kafka in a Nutshell", retrieved from the Internet on Sep. 17, 2018: https://sookocheff.com/post/kafka/kafka-in-a-nutshell/, Sep. 25, 2015, 22 pages.

*Primary Examiner* — Doon Y Chow
*Assistant Examiner* — Kimberly L Jordan
(74) *Attorney, Agent, or Firm* — Nicholson, De Vos, Webster & Elliott, LLP

(57) ABSTRACT

A method and system for event consumers management are described. A batch of events that is stored in an event recordation system according to an aggregate topic is received based on the aggregate topic. Each event from the batch of events is associated with an initial topic to be used by a respective instance of an event consumer from a set of event consumers to consume events. A first initial topic associated with one or more events from the batch of events is determined. Based on the first initial topic, a state of a first event consumer is updated to a running state. The updated state of the first event consumer causes execution of a first instance of the first event consumer on a server of a cluster of servers for consuming events from the event recordation system based on the first initial topic.

18 Claims, 8 Drawing Sheets

(56) References Cited

U.S. PATENT DOCUMENTS

| | | |
|---|---|---|
| 8,925,041 B2 | 12/2014 | Bulumulla et al. |
| 8,973,106 B2 | 3/2015 | Warshavsky et al. |
| 8,977,647 B2 | 3/2015 | Viripaeff et al. |
| 8,990,144 B2 | 3/2015 | Warshavsky et al. |
| 9,298,842 B2 | 3/2016 | Cinarkaya et al. |
| 9,417,840 B2 | 8/2016 | Pradeep et al. |
| 9,542,372 B2 | 1/2017 | Warshavsky et al. |
| 9,628,493 B2 | 4/2017 | Warshavsky et al. |
| 9,697,377 B2 | 7/2017 | Viripaeff et al. |
| 9,767,022 B2 | 9/2017 | Pradeep et al. |
| 9,767,040 B2 | 9/2017 | Pradeep et al. |
| 9,785,782 B2 | 10/2017 | Bulumulla et al. |
| 10,049,131 B2 | 8/2018 | Torman et al. |
| 10,178,156 B2 | 1/2019 | Pradeep et al. |
| 10,185,603 B2 | 1/2019 | Pradeep et al. |
| 10,298,582 B2 | 5/2019 | Syomichev et al. |
| 10,332,129 B2 | 6/2019 | Torman et al. |
| 10,339,126 B2 | 7/2019 | Pradeep et al. |
| 10,275,281 B2 | 8/2019 | Pradeep et al. |
| 10,380,094 B2 | 8/2019 | Warshavsky et al. |
| 10,452,462 B2 | 10/2019 | Oravivattanakul et al. |
| 10,496,456 B2 | 12/2019 | Pradeep et al. |
| 10,536,463 B2 | 1/2020 | Syomichev et al. |
| 10,666,569 B1 * | 5/2020 | Jacques de Kadt .... H04L 67/10 |
| 10,678,757 B2 | 6/2020 | Pradeep et al. |
| 10,776,825 B2 | 9/2020 | Zhao et al. |
| 10,891,175 B2 | 1/2021 | Pradeep et al. |
| 2012/0278817 A1 * | 11/2012 | Oliver .................... G06F 9/4843 |
| | | 719/318 |
| 2013/0191500 A1 * | 7/2013 | Shafi ...................... H04L 67/02 |
| | | 709/217 |
| 2016/0352649 A1 * | 12/2016 | Lin ....................... H04L 47/827 |
| 2017/0075922 A1 | 3/2017 | Torman et al. |
| 2017/0293632 A1 | 10/2017 | Pradeep et al. |
| 2017/0317935 A1 * | 11/2017 | Murthy .................. H04L 47/19 |
| 2018/0025113 A1 | 1/2018 | Torman et al. |
| 2018/0039513 A1 * | 2/2018 | Zhao ...................... G06F 9/542 |
| 2018/0096012 A1 | 4/2018 | Warshavsky et al. |
| 2018/0096165 A1 | 4/2018 | Warshavsky et al. |
| 2018/0293258 A1 | 10/2018 | Oravivattanakul et al. |
| 2019/0098068 A1 * | 3/2019 | Iliofotou ............. H04L 67/1002 |
| 2019/0238653 A1 | 8/2019 | Syomichev et al. |
| 2020/0097373 A1 * | 3/2020 | Zhao ................... G06F 11/1471 |
| 2020/0097503 A1 * | 3/2020 | Zhao ..................... G06F 16/907 |

* cited by examiner

METHOD AND SYSTEM FOR EVENT CONSUMER MANAGEMENT IN AN AGGREGATED EVENT PLATFORM

TECHNICAL FIELD

One or more implementations relate to the field of event consumption; and more specifically, to event consumer management in an aggregated event platform.

BACKGROUND ART

Web applications that serve and manage millions of Internet users, such as Facebook™, Instagram™, Twitter™, banking websites, as well as online retail shops, such as Amazon.com™ or eBay™ are faced with the challenge of ingesting high volumes of data as fast as possible so that the end users can be provided with a real-time experience.

The "Internet of Things" (IoT) is another major contributor to big data, supplying huge volumes of data. IoT has become a pervasive presence in the environment, with a variety of things/objects that communicate via wireless and wired connections to interact with each other and cooperate with other things/objects to create new applications/services. These applications/services exist in smart cities (regions), smart cars and mobility, smart homes and assisted living, smart industries, public safety, energy and environmental protection, agriculture and tourism. A massive quantity of data gets persisted from the millions of IoT devices and web applications.

In current event recordation systems, a high volume of events is stored and shared across features, tenants, and/or topics. These events are stored in an event recordation system based on an aggregate topic, where each aggregate topic is used for a subset of tenants from multiple tenants in a multi-tenant environment or for a subset of topics from multiple topics available for each tenant (e.g., the events are stored across a set of Kafka partitions, where each Kafka partition is used for a subset of tenants from a multi-tenant system or alternatively each Kafka topic is used for multiple initial topics with which the events were received in the system).

While the events are persisted based on an aggregate topic, these events are generated and consumed based on initial topics that are different from the aggregate topics. Since many initial topics and/or associated initial partitions share a given physical storage channel identified with an aggregate topic, if an instance of an event consumer is to request the events based on the aggregate topic, when receiving the events, the event consumer potentially needs to skip a large number of events that are associated with other initial topics and/or partitions in order to get data for a desired initial topic. The management of the instances of event consumers is quite challenging in an aggregated event platform. For example, if instances of event consumers are regularly put to sleep (i.e., in an idle state) each time an instance of an event consumer is woken up from the idle state, there's a large number of events to process and filter before relevant events are obtained. Alternatively, if the instances of the event consumers are never put to sleep (i.e., they are always running), this puts more load on the system, even if events aren't being consumed for certain initial topics. In another example, if event consumers are woken up each time an event is published, overhead for all event published is added.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

DETAILED DESCRIPTION

Figure 1:
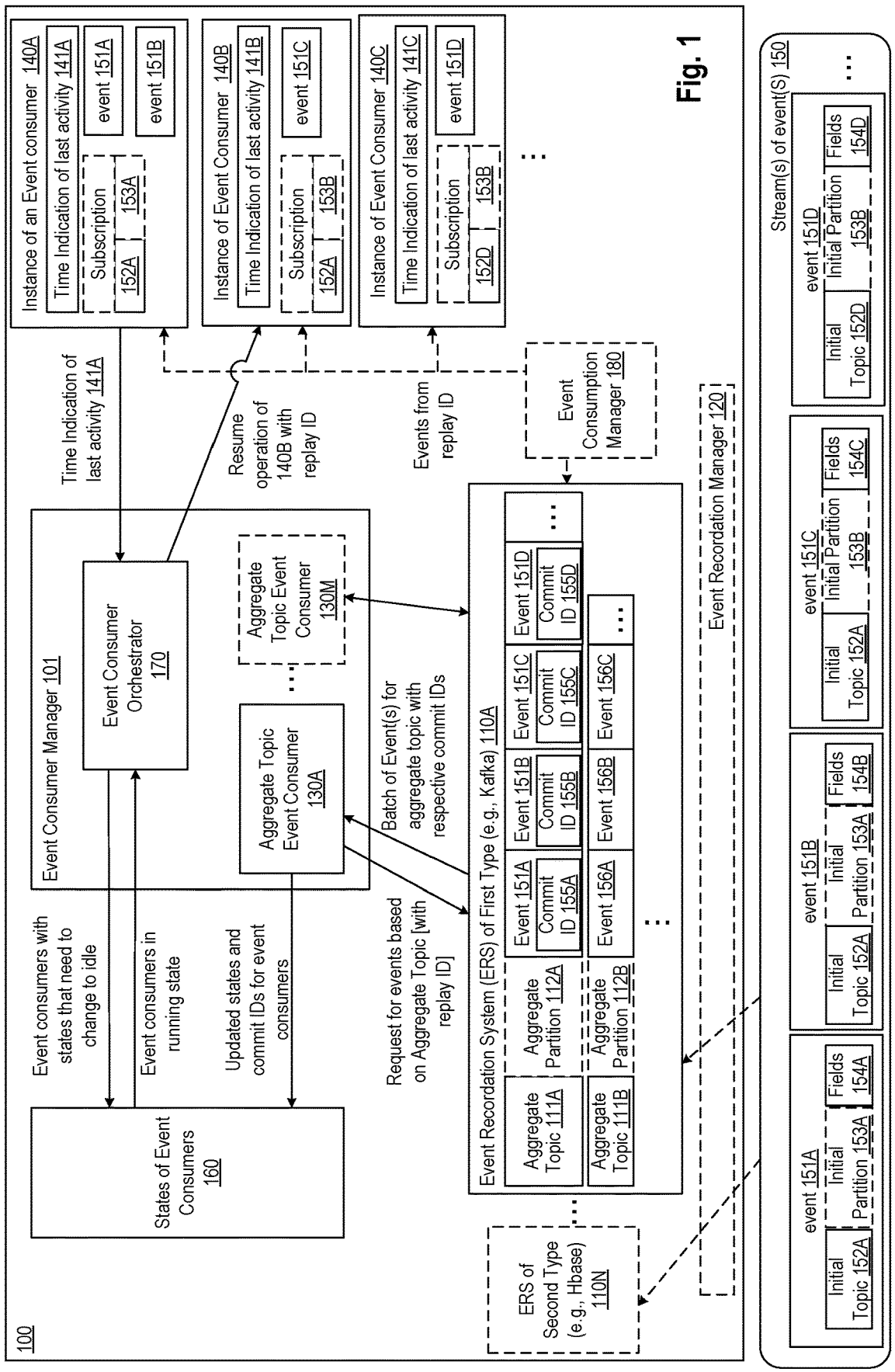
FIG. 1 illustrates a block diagram of an exemplary system for event consumer management in an aggregated event platform, in accordance with some implementations.

An event is an identifiable unit of data that conveys information about operations that occur in a system (e.g., measurements recorded in an IoT device, actions performed by a user of a social networking system, failures of an operation or a system, etc.). Events can be user-generated or system-generated. In some implementations, an event is associated with an initial partition and an initial topic. A topic can be information or details on the event that can be used to group one or more events. In a similar manner, the partition can be information on the event, which can be used to group multiple events. The partition and topic can be used to group events with the same topic and partition and can be used to transmit these events to one or more event consumers that requests them based on the initial partition and/or initial topic they are associated with. In a non-limiting example of a multi-tenant platform, the initial partition can be a tenant identifier (which can also be referred to as an organization identifier (org_ID)) where each one of the tenant identifiers uniquely identifies a tenant within the system. The initial topic can be a word or alphanumerical value added to a record generated in the system. Other examples of topics or partitions can be contemplated without departing from the scope of the present implementations.

In some implementations an event is associated with an initial topic when it is generated by an application or an event producer. In some implementations, the event is also associated with an initial partition. The initial topic and/or initial partition can be added to the event as an additional field to the other data included in the event. The initial topic and initial partition can be used as a schema to store and retrieve the event in an event recordation system, when this event recordation system is a database.

In some implementations, events persisted in an event recordation system are not stored based on the initial topic or initial partition, instead they are stored based on an aggregate topic and/or an aggregate partition. A multiplexing structure enables different components of an event recordation and distribution system to determine a correspondence between an initial topic (or initial topic and initial partition) and an aggregate topic (or aggregate topic and aggregate partition). The multiplexing structure can be used at the time of recordation of the event and the time of consumption of the event from the event recordation system. For example, when an event recordation system is not conceived to support a large scale of users, organizations/tenants, and/or devices, the events are multiplexed/aggregated based on the multiplexing framework, which results in the events being recorded in the event recordation system based on partitions and/or topics that are different from the ones with which the events were generated or received in the system. In such a multiplexing framework, the event recordation system scales to large number of initial topics and initial partitions while using a more restrained number of aggregate topics and aggregate partitions that are effectively used to persist the events in the event recordation system.

Event recordation and distribution systems using multiplexing platforms improve over previous event recordation and distribution platforms as they are not limited by the capacity of the topics/partitions used to store the events in physical storage systems. The aggregation of the events input with initial topics and/or initial partitions into one or more aggregated topics/partitions result in the ability to support a larger of initial topics (and initial partitions) than the actual topics/partition used in the physical storage available in an event recordation system. Further, the multiplexing framework allows multiple entities (e.g., customers, users, organizations, etc.) to share a same set of physical channels of an event recordation system.

While the events are persisted based on an aggregate topic, these events are generated and consumed based on initial topics that are different from the aggregate topics. One or more event consumers are to request access to these events and to retrieve these events based on the initial topics associated with the events. Typically instances of event consumers can be operating in a system to consume events from one or more event recordation systems.

The management of the instances of event consumers is quite challenging in an event recordation and distribution system that is based on a multiplexing platform. Since many initial topics and/or associated initial partitions share a given physical storage identified with an aggregate topic, if an instance of an event consumer is to request the events based on the aggregate topic, when receiving the events, the instance of the event consumer potentially needs to skip a large number of events that are associated with other initial topics and/or partitions in order to get data for a desired initial topic. Further, if instances of event consumers are regularly put to sleep (i.e., in an idle state), each time an instance of an event consumer is woken up from the idle state, there's a large number of events to process and filter before relevant events are obtained. If the instances of the event consumers are never put to sleep (i.e., they are always running), this puts more load on the system even if events aren't being consumed for certain initial topics. If event consumers are woken up each time an event is published significant overhead is added to allow for all event stored to be identified and consumed.

The implementations described herein propose a method and system for event consumers management. Some implementations are performed in an event recordation and distribution system that operates based on a multiplexing structure. A batch of events that is stored in an event recordation system according to an aggregate topic is received based on the aggregate topic. Each event from the batch of events is associated with an initial topic to be used by a respective instance of an event consumer from a set of event consumers to consume events. A first initial topic associated with one or more events from the batch of events is determined. Based on the first initial topic, a state of a first event consumer is updated to a running state. The updated state of the first event consumer causes execution of a first instance of the first event consumer on a server of a cluster of servers for consuming events from the event recordation system based on the first initial topic. The update of the state of an event consumer based on initial topics determined in a batch of events received based on an aggregate topic allows consumption of the events from an event recordation system to be independent of the path taken by the events to be stored in the event recordation system (which may be referred to as the publish path. Further, the events can be processed/consumed in batches for each aggregated topic instead of one by one significantly improving the efficiency of the system. The implementations described herein significantly improve the efficiency of an event recordation and distribution system both in terms of the publishing path and the consumption path.

FIG. 1 illustrates a block diagram of an exemplary event recordation and distribution system with efficient event consumer management, in accordance with some implementations. Event recordation and distribution system 100 (which may alternatively be referred to as the system 100) includes an event consumer manager 101, one or more event recordation system(s) 110A-N, one or more event consumers 140A-C, a states of event consumers 160, an optional event recordation manager 120, and an optional event consumption manager 180, and one or more streams of events 150.

The event system receives a stream of events 150 including multiple events 151A-D and is operative to store the events in one or more of the event recordation system 110A-N and enable consumption of the events from these systems 110A-N. In some implementations, the stream of events 150 can be received from a stream manager (not shown in FIG. 1) that manages the receipt of streams generated by one or more IoT devices, and/or application data source(s). The application data sources may include various applications running on software-as-a-service (SaaS), platform-as-a-service (PaaS) and/or infrastructure-as-a-service (IaaS) infrastructures. The applications can also include other types of distributed or non-distributed applications that produce streams of events.

Examples of events include device logs, clicks on links, impressions of recommendations, numbers of logins on a particular client, server logs, user's identities (sometimes referred to as user handles or user IDs and other times the users' actual names), content posted by a user to a respective feed on a social networking service, social graph data, metadata including whether comments are posted in reply to a prior posting, another event, or an article, and so forth. Events can be in a semi-structured data format like a JSON (JavaScript Option Notation), BSON (Binary JSON), XML, Protobuf, Avro or Thrift object, which present string fields (or columns) and corresponding values of potentially different types like numbers, strings, arrays, objects, etc. JSON objects can be nested and the fields can be multi-valued, e.g., arrays, nested arrays, etc., in other implementations.

In some implementations, terabytes of events per hour arrive for processing. In some implementations, the event streams input to the system 100 are stored in one of multiple event recordation systems 110A-110N and intended to be consumed, in real-time, pseudo-real time, or on-demand, by one or more event consumers such as event consumers 140A-C.

Each stream of events from the event streams 150 includes multiple events. For example, streams 150 includes events 151A-D. Each event from the stream includes an initial topic, an initial partition, and one or more additional fields. The additional fields can be referred to as a payload of the event. For example, event 151A has an initial topic 152A, an initial partition 153A, and one or more additional fields 154A. Event 151B has an initial topic 152A, an initial partition 153A, and one or more additional fields 154B. Event 151C has an initial topic 152A, an initial partition 153B, and one or more additional fields 154C. Event 151D has an initial topic 152D, an initial partition 153B, and one or more additional fields 154D.

Typically, events of a stream may have one of multiple initial partitions and initial topics. Some events may share the same partition and/or the same topic. For example, event 151A and event 151B have the same initial topic 152A and the same initial partition 153A. In another example, event 151C and event 151D share the same initial partition 153B but have different initial topics 152B and 152D respectively. In a third example, event 151A and event 151D have different initial partitions (153A and 153B respectively) and different initial topics 152A and 152D respectively.

In some implementations, when an initial partition refers to a tenant identifier in a multi-tenant environment, all events received with that same initial partition belong to the same tenant. In these implementations, events 151A and 151B are events of a same first tenant and events 151C and 151D are events of a same second tenant that is different from the first tenant. When the initial topic is an alphanumerical value entered by a user of the multi-tenant system to be associated with a record, an account, a task, etc., some events of a stream may have the same topic. The initial topics and initial partitions allow the event consumers to request the events stored in the event recordation system 110A-N. While the events are described as having a respective initial topic and initial partition, in some implementations, each event may only have an initial topic. The initial partition is an optional field that can be omitted in some implementations. For example, when the initial partition represents the identification of a tenant, when operating in a single tenant system, the events may not have a tenant identifier and therefore only a topic can be included in an event to enable event consumers to receive the events based on the topic.

Each instance from the instances of event consumers 140A-C is a process that is being executed on one or more servers of a distributed computing platform. The process is the actual execution of program code including instructions that form a computer program. Several instances may be associated with the same program code. For example, in a multi-tenant system, a first instance 140A is dedicated to a first tenant and a second instance of event consumer 140C executes the same code and is dedicated to a second tenant that is different from the first tenant. The illustrated instances 140A-C are all instances of corresponding event consumers that are in a running state. When an event consumer is not in a running state, i.e., its state is in an idle state, there is no corresponding instance.

The instances of event consumers 140A-C are operative to request and consume events stored in the event recordation systems 110A-N based on the initial topics (and/or the initial partitions). The instances of event consumers 140A-C can be used for gaining insight on the data embedded in the events, for gaining insight on the operations and actions performed in the applications and/or the IoT devices, and/or for gaining insight on the environment controlled or measured by the IoT devices and/or applications. In some implementations, the instances of the event consumers can request to obtain the events and process the events to perform one or more of audit, debug and support, forensic and compliance, and/or analytics of the applications and IoT devices. In some implementations, the instances of the event consumers 140A-C may be implemented in a distributed computing environment, where multiple instances of event consumers can be run on one or more servers. The event consumers 140 can be owned and operated by a same entity such as a multi-tenant cloud computing architecture supporting multiple customer services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). Alternatively, the one or more event consumers can be operated by multiple entities such as different customers of an event recordation and distribution service.

Figure 7:
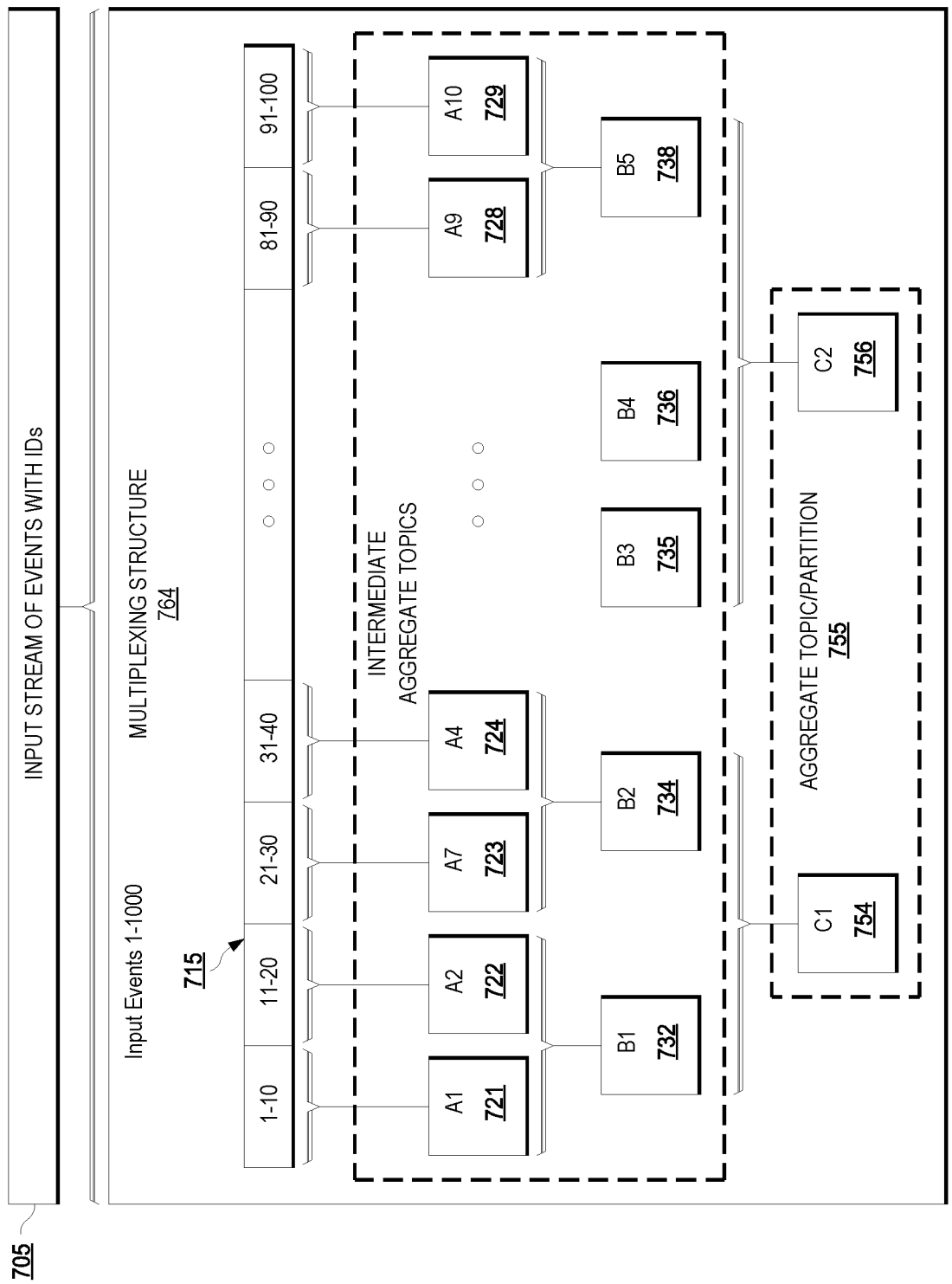
FIG. 7 illustrates a block diagram of an exemplary multiplexing structure for routing events associated with initial topics to an aggregate topic with which the events are persisted in an event recordation system, in accordance with some implementations.

The system 100 may include an optional event recordation manager 120 that is operative to handle how and where the events are recorded in one or more of the event recordation system 110A-N. In some implementations, the event recordation manager 120 is operative to use a multiplexing structure that is defined for the multiple initial topics available to store the events. FIG. 7 illustrates such an example of multiplexing structure such that multiple initial topics are aggregated in one aggregated topic. The aggregation can be done through one or more intermediate topics as illustrated in FIG. 7. In other implementations, the aggregation is a direct aggregation such that multiple initial topics are directly grouped into an aggregate topic that is used for storing the events in an event recordation system.

FIG. 7 illustrates a block diagram of an exemplary multiplexing structure for routing events associated with initial topics to an aggregate topic with which the events are persisted in an event recordation system, in accordance with some implementations. An input stream of events with IDs 715 enters the event recordation and distribution system 100. Each event is associated with an initial topic. A set of events with the same topic entering the system 100 can be referred to as an injection channel. FIG. 7 illustrates an example with channels ranging from channel 1 to channel 100. In this example, all events with a given topic are routed through the same route in the multiplexing structure 764. In some implementations, the injection channels are identified based on the initial topics and initial partitions. In another implementation, the injection channels can be identified based on only one of initial topics or initial partitions. Referring back to the example of event 151A, the initial topic 152A and the initial partition 153A identify the channel 100. While the example of FIG. 7 illustrates one hundred topics/channels, this is intended to be exemplary and other numbers of topics/channels, (e.g., several hundreds or thousands of topics/channels) can be included in one or more implementations to service the event consumers of the system 100.

The multiplexing structure 764 is an exemplary configuration in which events of injection channels one through ten are multiplexed into intermediate aggregate channel A1, 721, events of injection channels eleven through twenty are multiplexed into intermediate aggregate channel A2, 722, events of injection channels twenty-one through thirty are multiplexed into intermediate aggregate channel A3, 723, events of injection channels thirty-one through forty are multiplexed into intermediate aggregate channel A1, 721, events of injection channels eighty-one through ninety are multiplexed into intermediate aggregate channel A9, 728, and events of injection channels ninety-one through one hundred are multiplexed into intermediate aggregate channel A10, 729. Intermediate aggregate channels A1, 721 and A2, 722 are multiplexed into intermediate aggregate channel B1, 732 and intermediate aggregate channels A3, 723, and A4, 724, are multiplexed into intermediate aggregate channel B2, 734, and intermediate aggregate channels A9 728 and A10 729 are multiplexed into B5 738. Intermediate aggregate channels B1 732 and B2 734 are multiplexed into physical aggregate channel C1 754 and intermediate aggregate channels B3 735, B4 736 and B5 738 are multiplexed into physical aggregate channel C2 756. That is, in this example, all one hundred channels are multiplexed in physical aggregate channels C1 754 and C2 756, via the three-layer web of channels illustrated in FIG. 7. Each one of the channels is identified based on a topic and partition, or alternatively in other implementations based on a topic only. Each one of the intermediate channels is identified based on an intermediate topic or alternatively based on an intermediate topic and an intermediate partition. Each one of the aggregate channels is identified based on an aggregate topic or alternatively an aggregate topic and an aggregate partition.

In some implementations, when an event is aggregated to a next channel it is encapsulated in a topic and partition that corresponds to the channel to which it is aggregated to. For example, if the event 151A includes the initial topic 152A and initial partition 153A in the injection channel 100, it is encapsulated with an intermediary topic and intermediary partition that identify the channel A10 to which the event is aggregated. Similarly, events that are aggregated from A10 to B5 are encapsulated with a second intermediary topic and second intermediary partition that identify the channel B5. Events that are aggregated from B5 to C2 are encapsulated with a third topic and third partition that identify the channel C2. The third topics and third partitions can be referred to as aggregate topics and aggregate partitions.

In one implementation, the injection channels and intermediate aggregate channels are logical channels and the terminal aggregate channels are physical channels persisting events in a physical storage device. Physical aggregate channels persist events multiplexed from unique channels, in one of the event recordation systems 110A-N. For example, a first storage node C1 persists events in event recordation system 110A while second storage node C2 persists events in event recordation system of second type 110N. In another example, the C1 and C2 are persisted in the same event recordation system 110A.

While the multiplexing structure illustrates a given number of layers, here four layers, in other implementations a different number of layers can be used. For example, the multiplexing structure 764 may include two layers, a first layer including the injection channels, and a second layer including the physical aggregate channels identified based on the aggregate topics/partition 755. In other implementations, there is at least one intermediary aggregate layer between the first layer of injection channels and the lowest layer of physical aggregate channels. Further, while the illustrated multiplexing structure 764 includes 100 injection channels, ten channels of a first intermediary channels A1-A10, five channels of a second intermediary channels B1-B5, and two physical aggregate channels, in other implementations, a different number of channels can be used in each one of the layers.

While the operations will be described with the events and multiplexing structure described above, this is intended to be exemplary only and should not be regarded as a limitation of the present implementation. Other types of events or multiplexing structures can be contemplated without departing from the scope of the present invention.

In some implementations, the multiplexing structure 764 can be defined based on a current multiplexing framework definition stored in the event recordation manager 120. In some implementations, the current multiplexing framework definition is used by the event recordation manager 120 to determine for each input event associated with a given initial topic (or initial topic and initial partition) an associated intermediate or aggregate topic (or intermediate/aggregate topic and partition). This process can be repeated recursively until the event is assigned to a physical storage device to be stored based on an aggregate topic (or an aggregate topic and aggregate partition). In other implementations, the operations of the event recordation manager 120 are included within each one of the event recordation systems 110A-N and there is no separate module for the event recordation manager 120.

Thus, the multiplexing framework definition may include code and metadata that defines the multiplexing structure 764 by defining the number of levels, the number of channels per each level, as well as the paths from an initial channel at an initial level through optional intermediary aggregated channels to the lowest level, which is the physical aggregated channel.

Referring back to FIG. 1, the system 100 further includes one or more event recordation systems 110A-N that are operative to store the events. In the implementations presented herein, the instances of event consumers request events from the event recordation systems 110A-N based on initial topics/partitions when these events are stored based on modified topics partitions such as aggregate topics/partitions.

In the event recordation system of first type 110A the events are grouped with an associated aggregate topic and aggregate partition (e.g., aggregate topic 111A/aggregate partition 112A; aggregate topic 111B/aggregate partition 112B). Each event 151A-D includes an associated commit identifier (commit ID) 155A-D that identifies the event when stored in the event recordation system of first type 110A. The commit ID can be used as a confirmation that the event is physically stored in the system. The commit ID indicates the order of storage of a particular event with respect to other events that are associated with the same aggregate topic/partition. In some implementations, the commit ID is a number that increases from older events to more recent events. In some implementations, the commit ID of the latest event stored for a given pair aggregate topic/partition is recorded and available to the event recordation and distribution system 100.

In some implementations, the system includes several types of event recordation systems. For example, the system includes an event recordation system of first type 110A and an event recordation system of second type 110N. Each one of the event recordation systems stores data according to a different data structure mechanism. For example, event recordation system 110A may be a messaging system implemented based on a publish/subscribe platform, and the event recordation system of second type 110N can be a long-term storage non-relational database. Alternatively, other types of data structure systems can be used such as relational databases, etc. In some implementations, the event recordation system of first type 110A is a short-term storage medium, where the events have a time to leave associated with them after which they expire, and they are deleted from the system. In some implementations, events may be copied from a first event recordation system to another prior to being deleted at the first event recordation system such that they are only available from the event recordation system of second type. In some exemplary implementations, this can be done when the event recordation system of first type is a short-term storage solution and the event recordation system of second type 110N is a long-term storage solution and there is a need for keepings events for a longer period of time than the one supported by the event recordation system of first type 110A.

The system may further include an event consumption manager 180 that is coupled with the one or more event recordation systems 110A-N and is operative to receive requests from the instances of event consumers for events associated with an initial topic (or an initial topic and initial partition) and respond to these requests by transmitting events to the instances of event consumers. The system includes an event consumers manager 101. The event consumer manager 101 is operative to manage the execution of one or more instance of event consumers based on aggregate topics. The event consumer manager 101 includes one or more aggregate topic event consumers 130A-M and an event consumer orchestrator 170. The event consumer manager 101 is coupled with the states of event consumers 160 and with the instances of the event consumers 140A-C.

Each one of the aggregate topic event consumer 130A-M is a process that is operative to consume events associated with a given aggregate topic or alternatively with a given aggregate topic/aggregate partition. While the illustrated example shows multiple aggregate topic event consumers 130A-M, in other implementations any other number of aggregate topic event consumer can be included in the system 100. For example, if all initial topics are aggregated in a single aggregate topic, the system 100 may include a single aggregate topic event consumer. Each one of the aggregate topic event consumers 130A-M requests events from the event recordation system 110A based on an aggregate topic. Each one of the aggregate topic event consumers 130A-M receives a batch of events from the event recordation system 110A based on the aggregate topic. Each event is associated with an initial topic. The events received may be associated with different ones of initial topics. Based on the batch of events received for the aggregate topic, the aggregate topic event consumer 130A updates a state and replay IDs of one or more event consumers in the states of event consumers 160. In some implementations, if an event consumer is not yet present in the state of event consumers 160, updating the state of that consumer may include generating an entry for that consumer in the stats of event consumers 160.

The states of event consumers 160 includes for each event consumer an indication of the state of the event consumers. The indication of the state of the event consumer can be a running state or an idle state. When an event consumer's state is a running state that indicates that an instance of the event consumer is in execution. Alternatively, when an event consumer's state is an idle state that indicates that no instances of the event consumer is in execution.

The event consumer manager 101 also includes an event consumer orchestrator 170 that is operative to monitor instances of event consumers in execution and monitor states of event consumers in the states of event consumers 160. The event consumer orchestrator 170 can cause one or more instances of the event consumers to resume execution or stop execution based on their respective states in the states of event consumers 160.

In operation, the aggregate topic event consumer 130A receives a batch of events based on an aggregate topic. The aggregate topic event consumer 130A determines a first initial topic associated with one or more events from the batch of events. The first initial topic was aggregated in the aggregate topic. The aggregate topic event consumer 130A updates, based on the first initial topic, a state of a first event consumer to a running state; and causes, based on the state of the first event consumer, execution of a first instance of the first event consumer on a server of a cluster of servers for consuming events from the event recordation system based on the first initial topic.

In operation, the event consumer orchestrator 170 receives identifiers of event consumers that are in a running state and resume operation of instances of the event consumers as identified by the identifiers. The event consumer orchestrator 170 further receives time indications of last activity (e.g., 141A) of one or more instances of event consumers and transmit to the states of event consumers 160 identifiers of these event consumers to update their state from a running state to an idle state when applicable. Thus, the event consumer orchestrator 170 causes some instances of event consumers to be executed while causes some instances of event consumers to stop execution.

Figure 2:
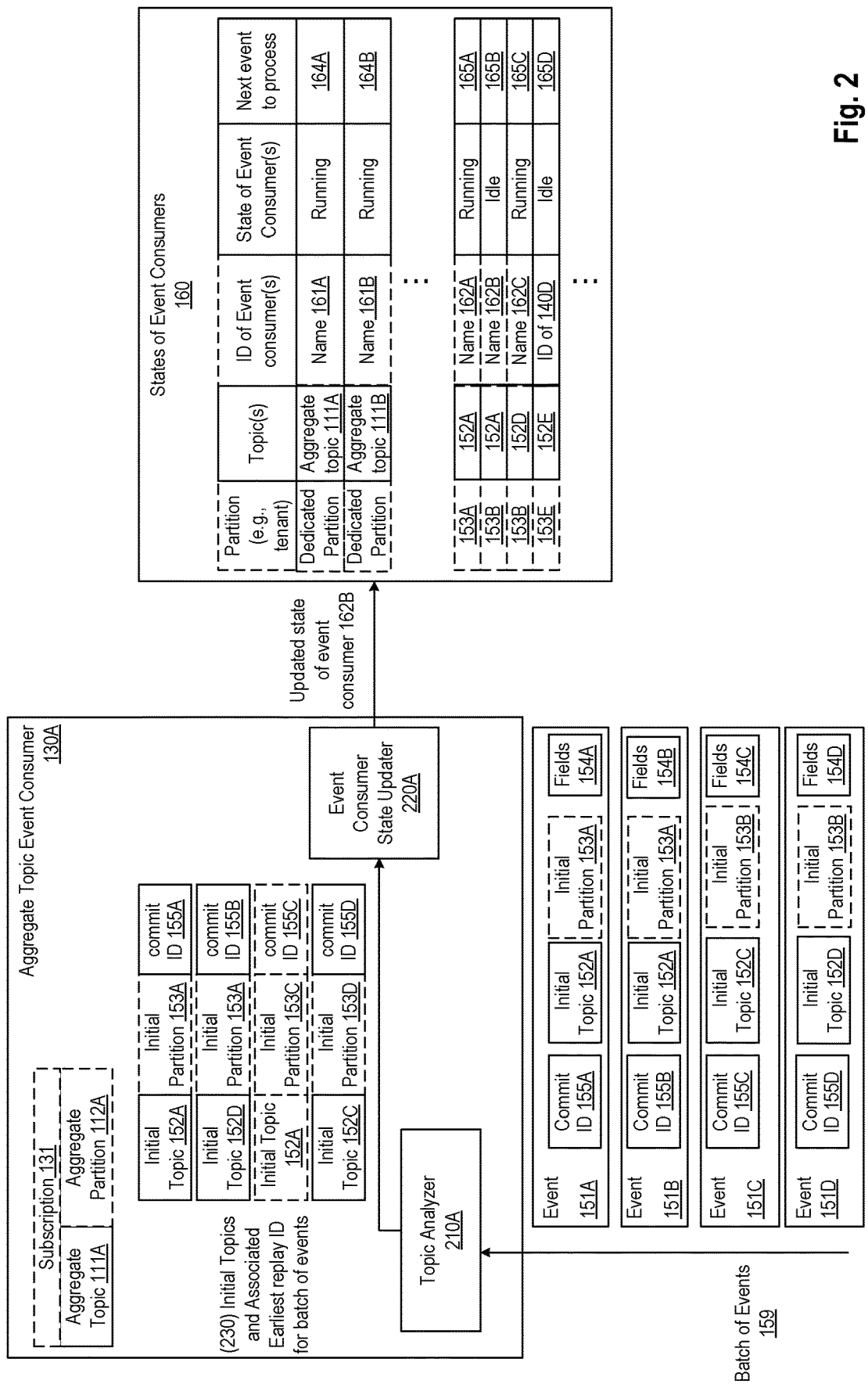
FIG. 2 illustrates a bock diagram of an exemplary aggregate topic event consumer, in accordance with some implementations.

FIG. 2 illustrates a bock diagram of an exemplary aggregate topic event consumer, in accordance with some implementations. The aggregate topic event consumer 130A receives, based on an aggregate topic, e.g., aggregate topic 111A, a batch of events 159 stored in an event recordation system, e.g., event recordation system 110A, according to the aggregate topic 111A. Each event from the batch of events includes an initial topic, e.g., one of 152A or 152D.

In the illustrated example, the batch of events 159 includes events 151A-D. Event 151A has commit ID 155A, an initial topic 152A, an initial partition 153A, and one or more additional fields 154A. Event 151B has commit ID 155B, an initial topic 152A, an initial partition 153A, and one or more additional fields 154B. Event 151C has commit ID 155C, an initial topic 152A, an initial partition 153B, and one or more additional fields 154C. Event 151D has commit ID 155D, an initial topic 152D, an initial partition 153B, and one or more additional fields 154D.

In some implementations, the receipt of the batch of events 159 is a result of a request transmitted from the aggregate topic event consumer 130A to the event recordation system 110A. In some implementations, the request is sent through the even consumption manager 180 that is operative to manage requests for events stored in the event recordation systems 110A-N. In other implementations, the request is directly transmitted to the event recordation systems 110A-N. In some implementations, transmitting a request includes subscribing to the aggregate topic 111A. In some implementations, the subscription 131 is a subscription for an aggregate topic 111A, while in other implementations, the subscription 131 is for an aggregate topic 111A and an aggregate partition 112A.

The aggregate topic event consumer 130A includes a topic analyzer 210A. The topic analyzer 210A determines a first initial topic associated with one or more events from the batch of events. The topic analyzer 210A may determine all initial topics identified in the batch of events received based on the aggregate topic. All of these initial topics are aggregated/multiplexed into the aggregate topic based on a multiplexing structure such as the multiplexing structure 764. For example, the topic analyzer 210A may determine initial topics 152A, 152D, and 152C, in some implementations. In another example, the topic analyzer 210A may determine couples of topics and partitions, e.g., 152A-153A, 152D-153A, 152A-153C, and 152C-153D. In some implementations, the topic analyzer 210A determines for each initial topic a corresponding earliest commit ID. The earliest commit ID is the identifier of the earliest event consumed by the aggregate topic event consumer 130A for a given initial topic. In the illustrated example, two events are received for initial topic 152A/partition 153A, events 151A and 151B. The earliest commit ID for the initial topic 152A/partition 153A is the commit ID associated with event 151A as event 151A is recorded in the event recordation system 110A prior to event 151B and the commit ID 155A is the earliest commit ID for initial topic 152A/partition 153A and aggregate topic 111A.

The aggregate topic event consumer 130A includes an event consumer state updater 220A. The event consumer state updater 220 is coupled with the states of event consumers 160 and updates, based on each initial topic, a state of a corresponding event consumer to a running state in the states of event consumers 160. In some implementations, the event consumer state updater 220 further indicates a replay identifier that identifies an event in the event recordation system. The replay identifier (replay ID) indicates to the event consumer the event from which consumption of the events is to start. In some implementations, the replay ID is the earliest commit ID for an initial topic/partition. In another implementation, the replay ID can be determined based on the earliest commit ID but allows for a more conservative consumption of events for the event consumer. For example, the replay ID can be the earliest commit ID-N such that the event consumer may re-consume up to a set of N events prior to reaching new events stored in the event recordation systems. In one implementation, the replay ID is earliest commit ID-1 such that the event consumer is to consume one old event and any new events that follow the previously consumed event.

The states of event consumers 160 includes a set of entries. Each entry includes a topic that determines the events that are to be received by an event consumer. For example, aggregate topic event consumer 161A is to receive events with aggregate topic 111A, the aggregate topic event consumer 161B is to receive events with aggregate topic 111B, a first event consumer 162A is to receive events with initial topic 152A, a second event consumer 162B is to receive events with initial topic 152A, a third event consumer 162C is to receive events with initial topic 152D, and a fourth event consumer 162D is to receive events with initial topic 152E. Each entry includes a state of the event consumer at a given time. The state of the event consumer can be a running state indicating that an instance of the event consumer is in execution, or alternatively the state of the event consumer can be an idle state indicating that no instance is in execution. In FIG. 2, the states of event consumers 160 is illustrated at a time t1 that is prior to the update performed by the event consumer state updater 220. For example, where the state of event consumer 162B is an idle state. The state of the event consumers 162A and 162C are running state and the state of the event consumers 162B and 162D are idle.

Each entry includes a replay identifier 164A-B and 165A-C identifying the next event from which the event consumer is to start consumption of the events. In some implementations, each entry may further include an identification a partition 153A-C or dedicated partitions. In some implementations, an event consumer can be identified based on the topic, based on the topic and the partition, and additionally or alternatively based on a name of the event consumer 161A-B or 162A-C. The name of the event consumer can be a name associated with a program code that when instantiated for a given topic or for a given topic and partition generates an instance of an event consumer (e.g., 140A-C). In other implementations, when a single type of program code is used for consumption of events, there may be no need to identify the program in the states of event consumers 160 and the topic or topic/partition is sufficient to identify an instance of the event consumer.

When the event consumer state updater 220 updates the states of the event consumers, it updates each corresponding entry to mark the "state of event consumer(s)" field to "running " When an entry does not yet exist in the states of event consumers 160 for a given event consumer, the event consumer state updater 220 is operative to populate the entry and update the state to "running " For example, the event consumer state updater 220 can update the state of the event consumer 162B, which is in idle states upon determination that there are events associated with the initial topic 152A and initial partition 153B. When the event consumer state updater 220 updates the replay ID for a given consumer, the "next event to process" field is updated based on the commit ID for a given topic/partition. The states of event consumers 160 includes two types of entries. A first set of entries that represent the aggregate topic event consumers 130A-M and a second set of entries that represent the event consumers associated with initial topics. The state of each aggregate topic event consumer 130A-M identified in the first set of entries is set to a running state and cannot be updated by the event consumer manager 101. These event consumers are in constant execution to allow for consumption of batches of events based on the aggregate topics or aggregate topics/ partitions. For the aggregate topic event consumers 130A-M, the field of "next event to process" includes the commit ID of the last event consumed for the aggregate topic by the respective aggregate topic event consumer 130A-M. The identifier stored in the next event to process field allows each one of the aggregate topic event consumers 130A-M to restart processing/consumption of the events from the event recordation system(s) 110A-N based on that replay identifier 164A-B. For example, each one of the replay identifier 164A-B can be used if execution of a respective aggregate topic event consumer is interrupted (e.g., due to failure) and restarted. In contrast with the example of the first set of event consumers (i.e., the aggregate topic event consumers 130A-M), the state of each event consumer from the second set of event consumers, 140A-C, can alternatively be set to a running state, by the event consumer state updater 220, or to the idle state by the event consumer orchestrator 170.

The aggregate topic event consumer 130A causes, based on the states of the event consumers, execution of instances of the event consumers, e.g., instance of event consumer 140B, on a server of a cluster of servers for consuming events from the event recordation system based on the first initial topic. In some implementations, the execution of the instances of the event consumer is further performed based on the replay identifier such that the first instance of the first event consumer, e.g., 140B, is to consume events from the event recordation system 110A starting from the first event that is identified with the replay identifier. In some implementations, the first event was not previously consumed by the instance of the event consumer 140B. Alternatively, the first event can be an event that was previously consumed by the instance of the event consumer followed with events that were not previously consumed by the instance of the event consumer.

Figure 3:
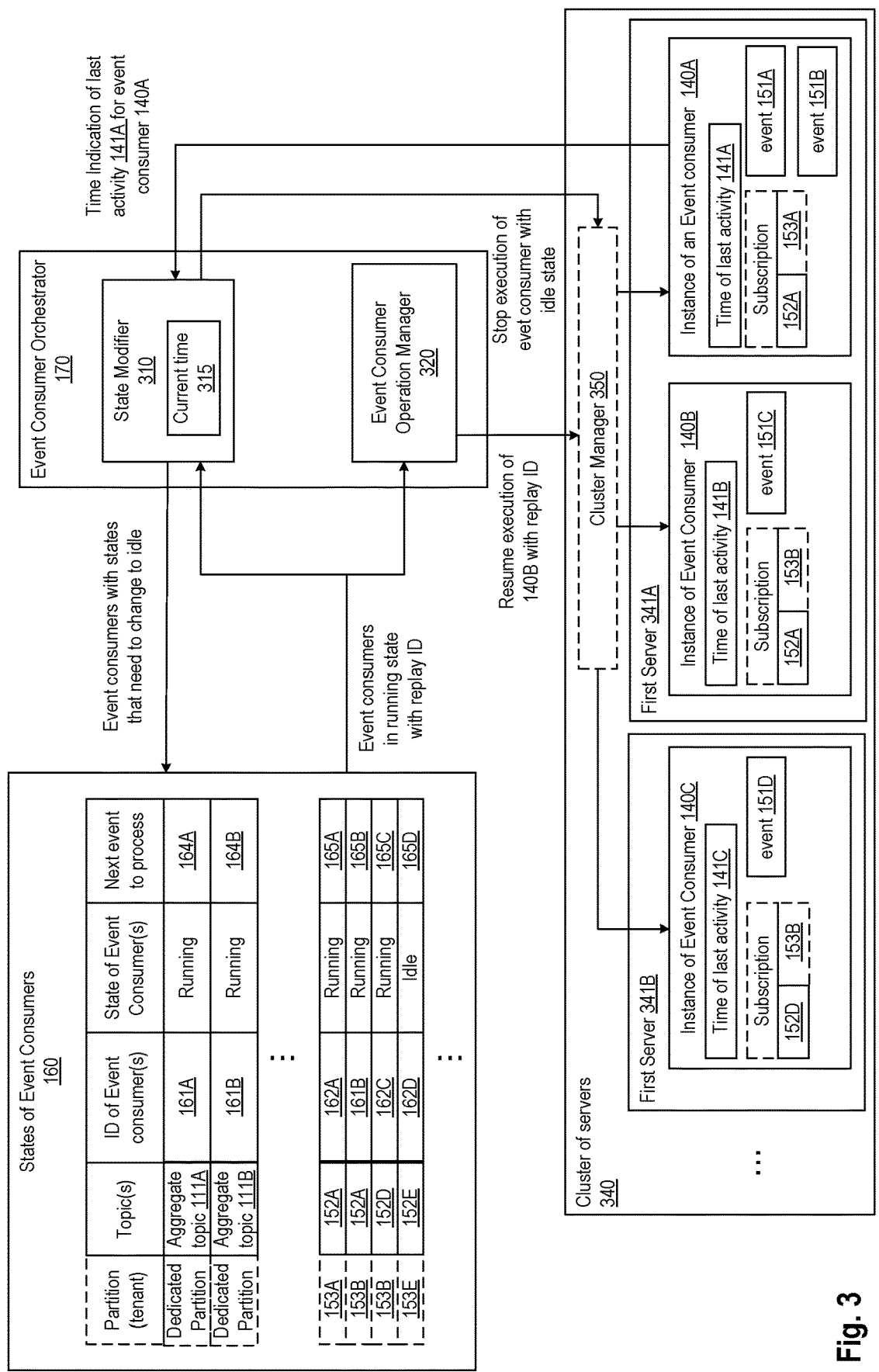
FIG. 3 illustrates a bock diagram of an exemplary event consumer orchestrator, in accordance with some implementations.

FIG. 3 illustrates a bock diagram of an exemplary event consumer orchestrator, in accordance with some implementations. The event consumer orchestrator 170 is operative to monitor instances of event consumers in execution and monitor states of event consumers in the states of event consumers 160. The event consumer orchestrator 170 can cause one or more instances of the event consumers to resume execution based on their respective states in the states of event consumers 160. The event consumer operation manager 320 receives the identifiers of one or more event consumers that have a running state. For example, the event consumer operation manager 320 can periodically request to obtain the identifiers of any event consumer that is in a running state. Alternatively, the event consumer operation manager 320 can receive the state of any event consumer that has changed from an idle state to a running state in a given interval of time automatically without transmitting a request. Any suitable mechanism for communication between the state of event consumers 160 and the event consumer operation manager 320 can be used for the event consumer operation manager 320 to identify event consumers that are or should be in a running state.

Referring back to the example of event consumer 162B, upon determination that the state of the event consumer has changed from an idle state to a running, the event consumer orchestrator causes execution of an instance 140B for processing events associated with initial topic 152A/partition 153B. In some implementations, the instance 140B can be instantiated through a cluster manager 350. In other implementations, the operations of the cluster manager 350, which operative to manage execution of instances of event consumers one or more servers of a server cluster 340, can be performed by the event consumer orchestrator 170. The instance 140B is executed on a first server 341A. In some implementations, two or more instances of event consumers, e.g., 140A and 140B, can be executed on the same server 341A. The instance of event consumer 140C is executed on a separate server 341B. In some implementations upon receipt of a request to instantiate an event consumer, the cluster manager 350 selects a server from the cluster of servers 340 and instantiates the event consumer 162B in the server 341A to obtain the instance of the event consumer 140B. The event consumer operation manager 320 causes the instance of the event consumer 140B to request events for initial topic 152A and initial partition 153B. In some implementations, the event consumer operation manager 320 causes the instance of event consumer 140B to subscribe to the initial topic 152A and initial partition 153B to obtain the events associated with these initial topic/partition.

In addition, the event consumer orchestrator 170 can cause one or more instances of the event consumers to stop execution based on a time indication of last activity. The state modifier 310 may periodically receive a time indication of last activity 141A for an event consumer, e.g., 140A, and determine based on this time indication, a current time 315, and the state of the event consumer whether to modify the state of the event consumer from a running state to an idle state in the states of event consumers 160.

The state modifier 310 receives identifiers of event consumers that are in a running state and resume operation of instances of the event consumers as identified by the identifiers and receives time indications of last activity (e.g., 141A) of one or more instances of event consumers and determines for each consumer with a running state whether the time indication of last activity is greater than a predetermined threshold. The time indication indicates the time at which a last activity (for example of event consumption) was performed by the respective instance of event consumer. This time indication is compared with the current time to determine whether the difference between the two exceeds the predetermined threshold. If the difference between the time indication and the current time is greater than the threshold, this indicates that the instance of event consumer hasn't been processing events for a long period of time and its state may now be changed to an idle state. The state modifier 310 transmits to the states of event consumers 160 identifiers of these event consumers to update their state from a running state to an idle state when applicable and causes the instances of these event consumer to no longer execute in the cluster of servers 340. This action free-up processing and storage resources that can be used to instantiate or improve the processing efficiency of other event consumers.

The implementations of the present application describe a mechanism for managing execution of event consumers efficiently. Event consumer are instantiated when it is determined from a batch of events that the batch includes at least one event that is to be consumed by the event consumer. Upon determination that the event consumer has not been processing events for a predetermined period of time, execution of the event consumer is stopped. The management of the event consumer of initial topics is performed based on the execution of aggregate topic event consumers which are operative to process events stored based on an aggregate topic as opposed to an initial topic.

Figure 4:
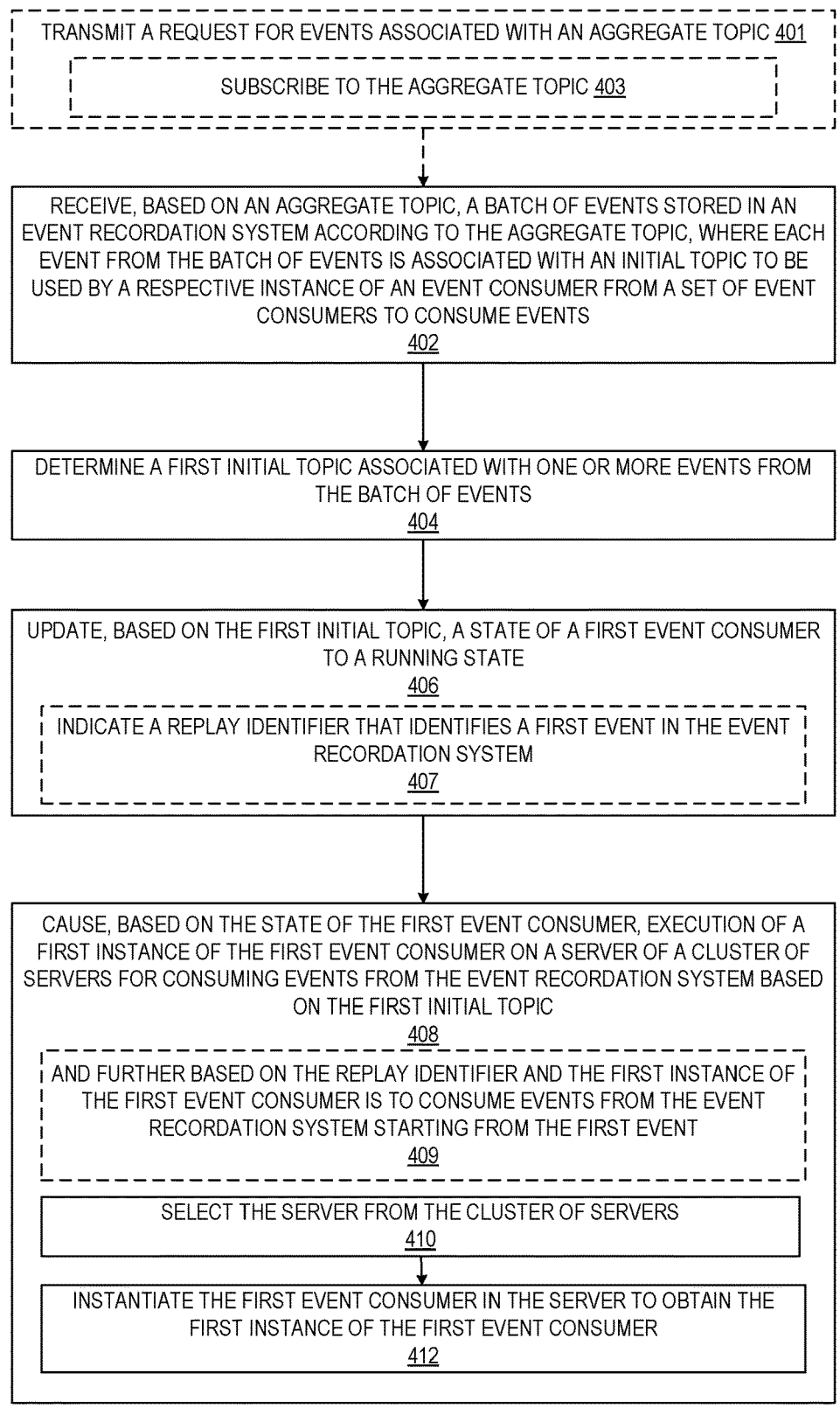
FIG. 4 illustrates a flow diagram of exemplary operations for event consumers management in an aggregated event platform, in accordance with some implementations.
Figure 5:
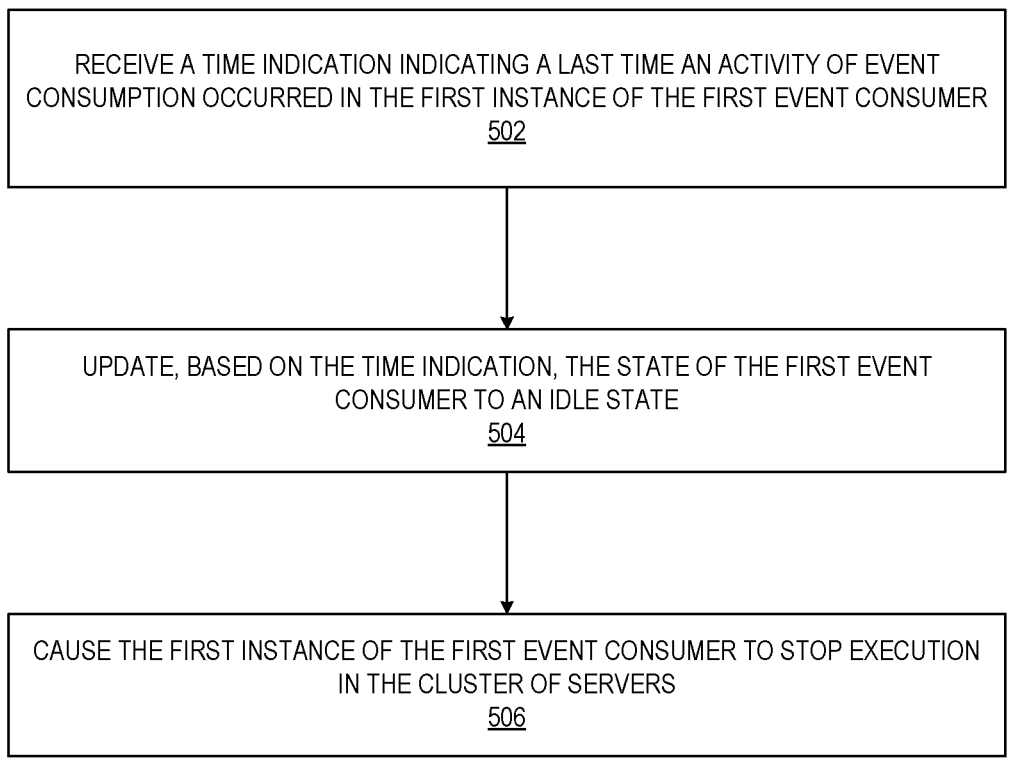
FIG. 5 illustrates a flow diagram of exemplary operations performed for updating a state of an event consumer from a running state to an idle state, in accordance with some implementations.
Figure 6:
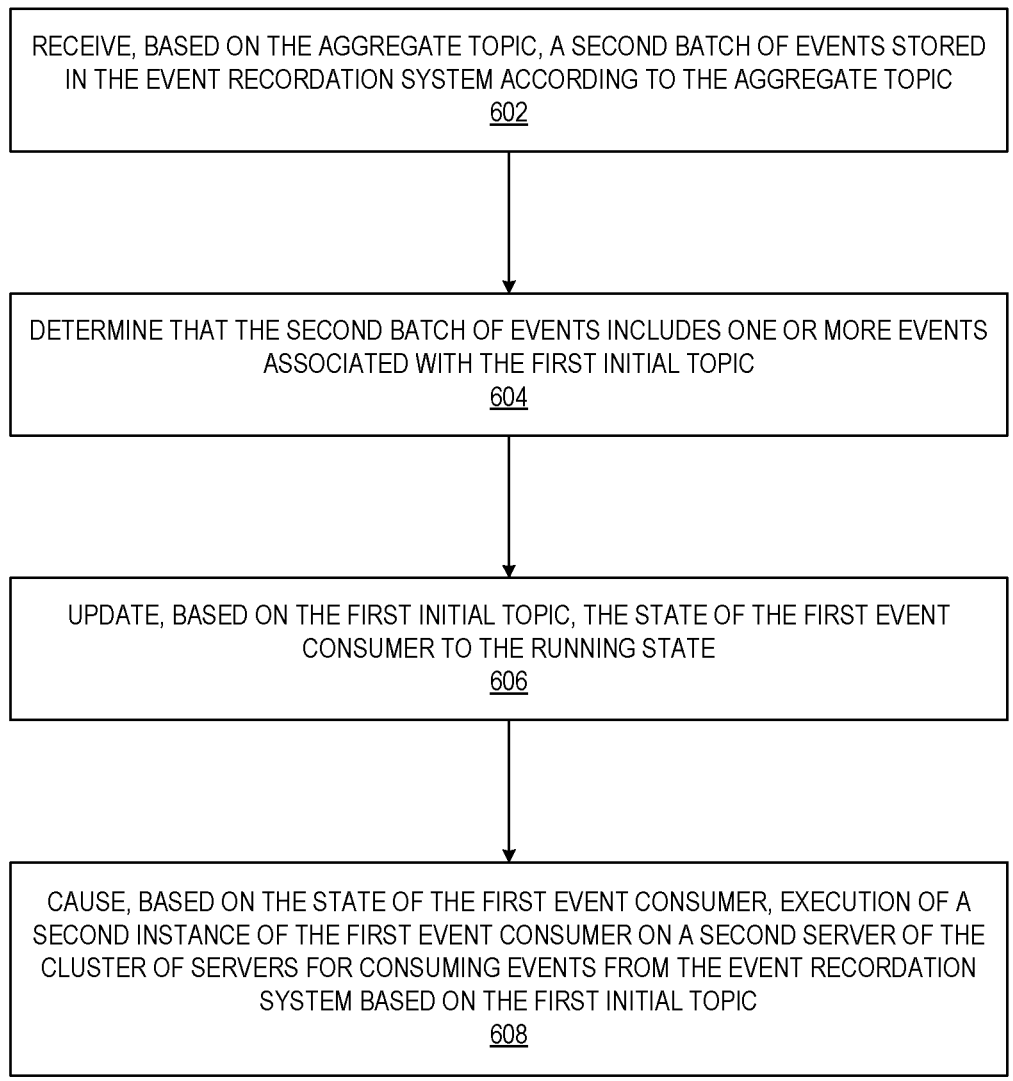
FIG. 6 illustrates a flow diagram of exemplary operations performed for updating a state of an event consumer from an idle state to a running state, in accordance with some implementations.

The operations in the flow diagrams of FIGS. 4-6 are described with reference to the exemplary implementations in FIGS. 1-3 and FIG. 7. However, the operations of the flow diagrams can be performed by implementations other than those discussed with reference to FIGS. 1-3 and FIG. 7, and the implementations discussed with reference to these figures can perform operations different than those discussed with reference to the flow diagrams.

FIG. 4 illustrates a flow diagram of exemplary operations for event consumers management in an aggregated event platform, in accordance with some implementations. At operation 402, the aggregate topic event consumer 130A receives, based on an aggregate topic, e.g., aggregate topic 111A, a batch of events stored in an event recordation system, e.g., event recordation system 110A, according to the aggregate topic. Each event from the batch of events is associated with an initial topic, e.g., one of 152A or 152D, to be used by a respective instance of an event consumer from a set of event consumers to consume events. In some implementations the receipt of the batch of events is a result of a request transmitted, at operation 401, from the aggregate topic event consumer 130A to the event recordation system 110A. In some implementations, the request is sent through the even consumption manager 180 that is operative to manage requests for events stored in the event recordation systems 110A-N. In other implementations, the request is directly transmitted to the event recordation systems 110A-N. In some implementations, transmitting a request includes subscribing to the aggregate topic 111A, at operation 403.

At operation 404, the aggregate topic event consumer 130A determines a first initial topic associated with one or more events from the batch of events. In some implementations, the aggregate topic event consumer 130A may determine more than a first initial topic. For example, the aggregate topic event consumer 130A may determine all initial topics identified in the events received in the batch of events based on the aggregate topic. All of these initial topics are aggregated/multiplexed into the aggregate topic based on a multiplexing structure such as the multiplexing structure 764.

At operation 406, the aggregate topic event consumer 130A updates, based on the first initial topic, a state of a first event consumer to a running state. In some implementations, the aggregate topic event consumer 130A further indicates, at operation 407, a replay identifier that identifies a first event in the event recordation system.

At operation 408, the aggregate topic event consumer 130A causes, based on the state of the first event consumer, execution of a first instance of the first event consumer, e.g., instance of event consumer 140B, on a server of a cluster of servers for consuming events from the event recordation system based on the first initial topic. In some implementations, the execution of the first instances of the first event consumer is further performed based on the replay identifier such that the first instance of the first event consumer, e.g., 140B, is to consume events from the event recordation system 110A starting from the first event that is identified with the replay identifier. In some implementations, the first event was not previously consumed by the first instance of the first event consumer 140B. In some implementations causing execution of a first instance of an event consumer includes selecting, at operation 410, a server from the cluster of servers and instantiating, at operation 412, the first event consumer in the server to obtain the first instance of the first event consumer.

In some embodiments, upon determination that an instance of an event consumer is no longer processing events for a given period of time, the state of the event consumer is updated to the idle state and execution of the instance is stopped. FIG. 5 illustrates a flow diagram of exemplary operations performed for updating a state of an event consumer from a running state to an idle state, in accordance with some implementations. In some implementations, the operations of FIG. 5 can be performed by a state modifier 310. At operation 502, the state modifier 310 receives a time indication indicating a last time an activity of event consumption occurred in the first instance of the first event consumer. At operation 504, the state modifier 310 updates, based on the time indication, the state of the first event consumer to an idle state. In some implementations, the update of the state of the event consumer is performed based on the time indication, a current time, and the state of the event consumer. At operation 506, the state modifier 310 causes the first instance of the first event consumer to stop execution in the cluster of servers.

In some implementations, the state of an event consumer can reverse back to being a running state after receipt of a second batch of events based on the same aggregate topic 111A and determining that new events are included for an initial topic. FIG. 6 illustrates a flow diagram of exemplary operations performed for updating a state of an event consumer from an idle state to a running state, in accordance with some implementations. At operation 602, the aggregate topic event consumer 130A receives, based on the aggregate topic, a second batch of events stored in the event recordation system according to the aggregate topic. At operation 604, the aggregate topic event consumer 130A determines that the second batch of events includes one or more events associated with the first initial topic and updates, based on the first initial topic, the state of the first event consumer to the running state. The aggregate topic event consumer 130A causes, based on the state of the first event consumer, execution of a second instance of the first event consumer on a second server of the cluster of servers for consume events from the event recordation system based on the first initial topic.

The update of the state of an event consumer based on initial topics determined in a batch of events received based on an aggregate topic allows consumption of the events from an event recordation system to be independent of the path taken by the events to be stored in the event recordation system (which may be referred to as the publish path). Further, the events can be processed/consumed in batches for each aggregated topic instead of one by one significantly improving the efficiency of the system. The implementations described herein further provide a significant advantage with the ability to free up resources used by event consumers and only use those resources when needed (based on events being published and consumed according to the aggregate topic).

The implementations described herein significantly improve the efficiency of an event recordation and distribution system both in terms of the publishing path and the consumption path by using dedicated aggregate topic event consumers that when executed consume events based on an aggregate topic and cause instances of event consumers to be executed or not based on the initial topics identified in the events consumed based on the aggregate topic.

General Architecture

The term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

"Cloud computing" services provide shared resources, software, and information to computers and other devices upon request. In cloud computing environments, software can be accessible over the internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 8A:
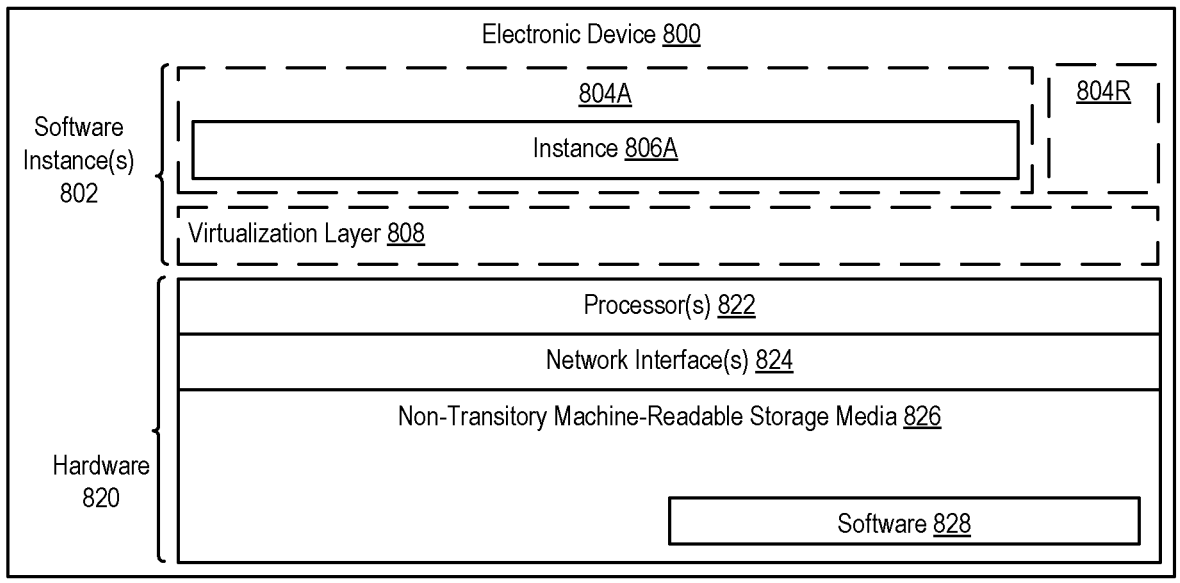
FIG. 8A is a block diagram illustrating an electronic device, in accordance with some implementations.

FIG. 8A is a block diagram illustrating an electronic device 800 according to some example implementations. FIG. 8A includes hardware 820 comprising a set of one or more processor(s) 822, a set of one or more network interfaces 824 (wireless and/or wired), and non-transitory machine-readable storage media 826 having stored therein software 828 (which includes instructions executable by the set of one or more processor(s) 822).

In electronic devices that use compute virtualization, the set of one or more processor(s) 822 typically execute software to instantiate a virtualization layer 808 and software container(s) 804A-R (e.g., with operating system-level virtualization, the virtualization layer 808 represents the kernel of an operating system (or a shim executing on a base operating system) that allows for the creation of multiple software containers 804A-R (representing separate user space instances and also called virtualization engines, virtual private servers, or jails) that may each be used to execute a set of one or more applications; with full virtualization, the virtualization layer 808 represents a hypervisor (sometimes referred to as a virtual machine monitor (VMM)) or a hypervisor executing on top of a host operating system, and the software containers 804A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 828 (illustrated as instance 806A) is executed within the software container 804A on the virtualization layer 808. In electronic devices where compute virtualization is not used, the instance 806A on top of a host operating system is executed on the "bare metal" electronic device 800. The instantiation of the instance 806A, as well as the virtualization layer 808 and software containers 804A-R if implemented, are collectively referred to as software instance(s) 802.

Alternative implementations of an electronic device may have numerous variations from that described above. For example, customized hardware and/or accelerators might also be used in an electronic device.

Figure 8B:
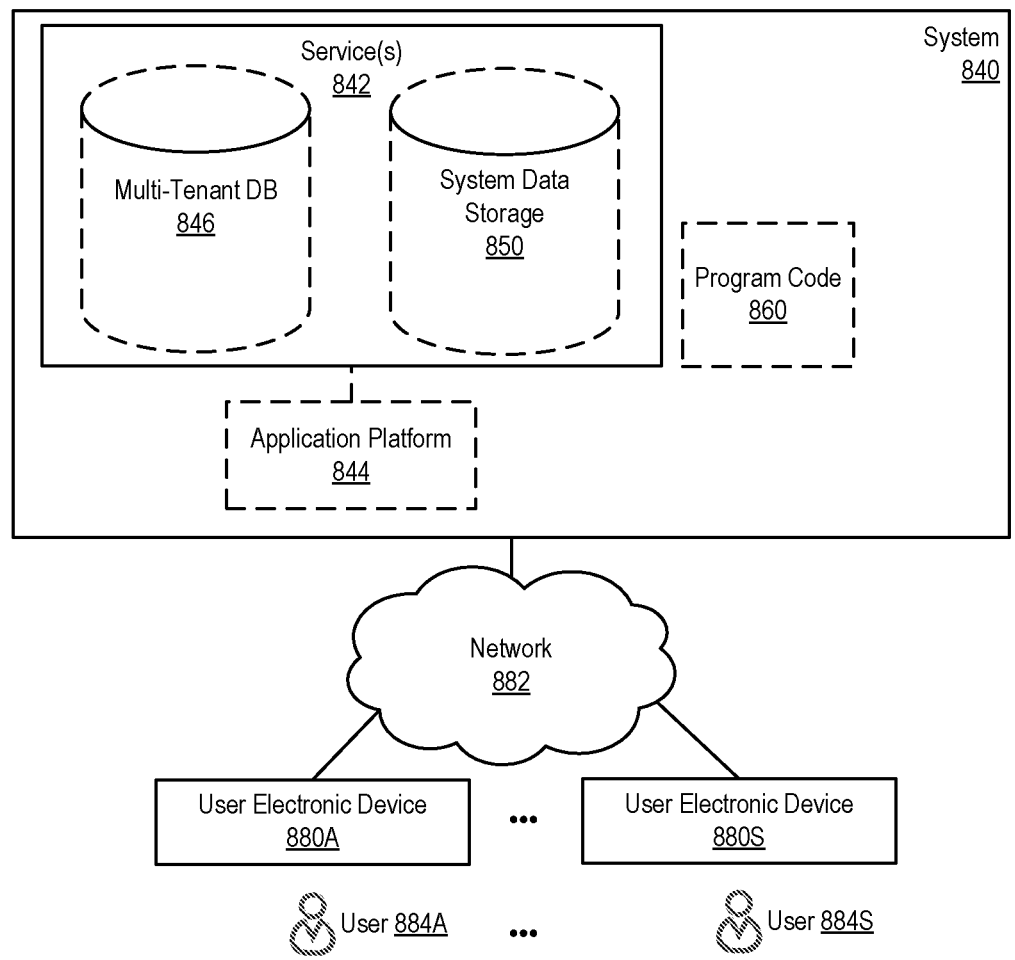
FIG. 8B is a block diagram of an environment where a mechanism for event consumer management in an aggregated event platform may be deployed, in accordance with some implementations.

FIG. 8B is a block diagram of an environment where a mechanism for event consumer management in an aggregated event platform may be deployed, in accordance with some implementations. A system 840 includes hardware (a set of one or more electronic devices) and software to provide service(s) 842, including the log consumers and/or the tokenizer. The system 840 is coupled to user electronic devices 880A-S over a network 882. The service(s) 842 may be on-demand services that are made available to one or more of the users 884A-S working for one or more other organizations (sometimes referred to as outside users) so that those organizations do not need to necessarily be concerned with building and/or maintaining a system, but instead makes use of the service(s) 842 when needed (e.g., on the demand of the users 884A-S). The service(s) 842 may communicate with each other and/or with one or more of the user electronic devices 580A-S via one or more Application Programming Interface(s) (APIs) (e.g., a Representational State Transfer (REST) API). The user electronic devices 880A-S are operated by users 884A-S.

In one implementation, the system 840 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), an Artificial Intelligence service (e.g., Einstein by Salesforce.com, Inc.), and/or Infrastructure as a Service (IAAS) (e.g., virtual machines, servers, and/or storage). For example, system 540 may include an application platform 544 that enables PAAS for creating, managing, and executing one or more applications developed by the provider of the application platform 544, users accessing the system 540 via one or more of user electronic devices 580A-S, or third-party application developers accessing the system 540 via one or more of user electronic devices 580A-S.

In some implementations, one or more of the service(s) 542 may utilize one or more multi-tenant databases 546, as well as system data storage 850 for system data 852 accessible to system 840. In certain implementations, the system 840 includes a set of one or more servers that are running on server electronic devices and that are configured to handle requests for any authorized user associated with any tenant (there is no server affinity for a user and/or tenant to a specific server). The user electronic device 880A-S communicate with the server(s) of system 840 to request and update tenant-level data and system-level data hosted by system 840, and in response the system 840 (e.g., one or more servers in system 840) automatically may generate one or more Structured Query Language (SQL) statements (e.g., one or more SQL queries) that are designed to access the desired information from the one or more multi-tenant database 846 and/or system data storage 850.

In some implementations, the service(s) 842 are implemented using virtual applications dynamically created at run time responsive to queries from the user electronic devices 880A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 860 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 844 includes an application setup mechanism that supports application developers' creation and management of applications, which may be saved as metadata by save routines. Invocations to such applications, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 882 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), or similar wired and/or wireless protocols, and may include one or more intermediary devices for routing data between the system 840 and the user electronic devices 880A-S.

Each user electronic device 880A-S (such as a desktop personal computer, workstation, laptop, Personal Digital Assistant (PDA), smart phone, augmented reality (AR) devices, virtual reality (VR) devices, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 840. For example, the user interface device can be used to access data and applications hosted by system 840, and to perform searches on stored data, and otherwise allow a user 884 to interact with various GUI pages that may be presented to a user 884. User electronic devices 880A-S might communicate with system 840 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 880A-S might include an HTTP client, commonly referred to as a "browser," for sending and receiving HTTP messages to and from server(s) of system 840, thus allowing users 884 of the user electronic device 580A-S to access, process and view information, pages and applications available to it from system 840 over network 882.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is within the knowledge of one skilled in the art to affect such feature, structure, or characteristic in connection with other implementations whether or not explicitly described.

For example, the figure(s) illustrating flow diagrams are sometimes described with reference to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, implementations, other than those discussed with reference to the block diagrams, for performing the flow diagrams are within the scope of this description, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the detailed description and claims, the term "coupled," along with its derivatives, may be used. "Coupled" is used to indicate that two or more elements, which may or may not be in direct physical or electrical contact with each other, co-operate or interact with each other.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for event consumers management, the method comprising:
   receiving, by a first aggregate topic event consumer from a plurality of aggregate topic event consumers based on an aggregate topic, a batch of events stored in an event recordation system according to the aggregate topic, wherein an event from the batch of events is associated with a first initial topic that is different from the aggregate topic and the first initial topic is to be used by an instance of an event consumer from a set of event consumers to consume the event;
   determining, by the first aggregate topic event consumer, the first initial topic associated with one or more events from the batch of events;
   updating, by the first aggregate topic event consumer based on the first initial topic, a state of a first event consumer in a states of event consumers from an idle state to a running state, wherein the idle state indicates that no instance of the first event consumer is in execution in a cluster of servers, wherein the states of event consumers includes entries representing the plurality of aggregate topic event consumers and entries representing event consumers associated with initial topics, wherein a state of each aggregate topic event consumer identified in the entries representing the plurality of aggregate topic event consumers is set to the running state and cannot be updated by an event consumer manager whereas a state of each event consumer identified in the entries representing the event consumers associated with initial topics can be set by the event consumer manager to the running state or the idle state; and
   causing, by the event consumer manager based on a determination that the state of the first event consumer has changed from the idle state to the running state, execution of a first instance of the first event consumer on a server of the cluster of servers for consuming events from the event recordation system based on the first initial topic.

2. The method of claim 1, wherein causing, based on the determination that the state of the first event consumer has changed from the idle state to the running state, execution of the first instance of the first event consumer includes:
   selecting the server from the cluster of servers; and
   instantiating the first event consumer in the server to obtain the first instance of the first event consumer.

3. The method of claim 1, further comprising:
- receiving a time indication indicating a last time an activity of event consumption occurred in the first instance of the first event consumer;
- updating, based on the time indication, the state of the first event consumer to an idle state; and
- causing the first instance of the first event consumer to stop execution in the cluster of servers.

4. The method of claim 3, wherein the batch of events is a first batch of events, and the method further comprises:
- receiving, based on the aggregate topic, a second batch of events stored in the event recordation system according to the aggregate topic;
- determining that the second batch of events includes one or more events associated with the first initial topic;
- updating, based on the first initial topic, the state of the first event consumer to the running state; and
- causing, based on the state of the first event consumer, execution of a second instance of the first event consumer on a second server of the cluster of servers for consuming events from the event recordation system based on the first initial topic.

5. The method of claim 1, wherein updating the state of the first event consumer includes indicating a replay identifier that identifies a first event in the event recordation system;
- and wherein causing execution of the first instance of the first event consumer is further based on the replay identifier and the first instance of the first event consumer is to consume events from the event recordation system starting from the first event.

6. The method of claim 5, wherein the first event was not previously consumed by the first instance of the first event consumer.

7. The method of claim 1, wherein the event from the batch of events is further associated with a tenant identifier and events of multiple tenants are stored in the event recordation system according to the aggregate topic.

8. The method of claim 1 further comprising:
- subscribing to the aggregate topic; and
- wherein receiving the batch of events is a result of the subscribing.

9. The method of claim 1, wherein the batch of events further includes a second event that is associated with a second initial topic that is different from the first initial topic and the second initial topic is to be used by a second instance of a second event consumer to consume the second event.

10. A non-transitory computer readable storage medium that stores instructions that when executed by one or more processors causes the one or more processors to perform the following operations:
- receiving, by a first aggregate topic event consumer from a plurality of aggregate topic event consumers based on an aggregate topic, a batch of events stored in an event recordation system according to the aggregate topic, wherein an event from the batch of events is associated with a first initial topic that is different from the aggregate topic and the first initial topic is to be used by an instance of an event consumer from a set of event consumers to consume the event;
- determining, by the first aggregate topic event consumer, the first initial topic associated with one or more events from the batch of events;
- updating, by the first aggregate topic event consumer based on the first initial topic, a state of a first event consumer in a states of event consumers from an idle state to a running state, wherein the idle state indicates that no instance of the first event consumer is in execution in a cluster of servers, wherein the states of event consumers includes entries representing the plurality of aggregate topic event consumers and entries representing event consumers associated with initial topics, wherein a state of each aggregate topic event consumer identified in the entries representing the plurality of aggregate topic event consumers is set to the running state and cannot be updated by an event consumer manager whereas a state of each event consumer identified in the entries representing the event consumers associated with initial topics can be set by the event consumer manager to the running state or the idle state; and
- causing, by the event consumer manager based on a determination that the state of the first event consumer has changed from the idle state to the running state, execution of a first instance of the first event consumer on a server of the cluster of servers for consuming events from the event recordation system based on the first initial topic.

11. The non-transitory computer readable storage medium of claim 10, wherein causing, based on the determination that the state of the first event consumer has changed from the idle state to the running state, execution of the first instance of the first event consumer includes:
- selecting the server from the cluster of servers; and
- instantiating the first event consumer in the server to obtain the first instance of the first event consumer.

12. The non-transitory computer readable storage medium of claim 10, wherein the operations further comprise:
- receiving a time indication indicating a last time an activity of event consumption occurred in the first instance of the first event consumer;
- updating, based on the time indication, the state of the first event consumer to an idle state; and
- causing the first instance of the first event consumer to stop execution in the cluster of servers.

13. The non-transitory computer readable storage medium of claim 12, wherein the batch of events is a first batch of events, and the operations further comprise:
- receiving, based on the aggregate topic, a second batch of events stored in the event recordation system according to the aggregate topic;
- determining that the second batch of events includes one or more events associated with the first initial topic;
- updating, based on the first initial topic, the state of the first event consumer to the running state; and
- causing, based on the state of the first event consumer, execution of a second instance of the first event consumer on a second server of the cluster of servers for consuming events from the event recordation system based on the first initial topic.

14. The non-transitory computer readable storage medium of claim 10, wherein updating the state of the first event consumer includes indicating a replay identifier that identifies a first event in the event recordation system; and wherein causing execution of the first instance of the first event consumer is further based on the replay identifier and the first instance of the first event consumer is to consume events from the event recordation system starting from the first event.

15. The non-transitory computer readable storage medium of claim 14, wherein the first event was not previously consumed by the first instance of the first event consumer.

16. The non-transitory computer readable storage medium of claim 10, wherein the event from the batch of events is further associated with a tenant identifier and events of multiple tenants are stored in the event recordation system according to the aggregate topic.

17. The non-transitory computer readable storage medium of claim 10 further comprising:
   subscribing to the aggregate topic; and
   wherein receiving the batch of events is a result of the subscribing.

18. The non-transitory computer readable storage medium of claim 10, wherein the batch of events further includes a second event that is associated with a second initial topic that is different from the first initial topic and the second initial topic is to be used by a second instance of a second event consumer to consume the second event.

* * * * *